United States Patent [19]
Nakamura et al.

[11] Patent Number: 5,508,983
[45] Date of Patent: Apr. 16, 1996

[54] OPTICAL DISC PLAYER WITH SHOCKPROOF CONTROLLER AND METHOD OF PROCESSING REPRODUCTION DATA

[75] Inventors: Shinobu Nakamura; Mamoru Akita, both of Kanagawa, Japan

[73] Assignee: Sony Corporation, Tokyo, Japan

[21] Appl. No.: 352,793

[22] Filed: Dec. 1, 1994

[30] Foreign Application Priority Data

Dec. 22, 1993 [JP] Japan .................... 5-346575

[51] Int. Cl.$^6$ .................................. G11B 17/22
[52] U.S. Cl. ................................ 369/32; 369/54
[58] Field of Search ................ 369/32, 33, 47, 369/48, 54, 13, 124, 60

[56] References Cited

U.S. PATENT DOCUMENTS

| | | | |
|---|---|---|---|
| 4,796,247 | 1/1989 | Vogelsang | 369/33 |
| 5,214,631 | 5/1993 | Maeda et al. | 369/124 |
| 5,317,553 | 5/1994 | Ohga et al. | 369/54 |
| 5,408,478 | 4/1995 | Ohmori et al. | 369/54 |
| 5,410,525 | 4/1995 | Yokota | 369/32 |
| 5,412,628 | 5/1995 | Yamazaki et al. | 369/32 |
| 5,418,762 | 5/1995 | Kitayama | 369/13 |

Primary Examiner—Georgia Y. Epps
Assistant Examiner—Tan Dinh
Attorney, Agent, or Firm—Ronald P. Kananen

[57] ABSTRACT

An optical disc player wherein an amount of jitter in a write clock as opposed to a read clock is detected by a jitter counter, a the write clock is counted by a reference counter for the number of frames, the jitter amount is added/subtracted to/from the count output by an adder/subtractor, an offset for the predetermined number of frames is given to a result of the addition/subtraction to generate a subcode synchronizing signal completely synchronized with the read clock. The subcode synchronizing signal is outputted through an output determining circuit only when a reproduction subcode synchronizing signal is found matching by a match detector with the count output of the reference counter twice successively. The device can correctly perform sound linking even for software having successive fixed patterns and perform sound linking without error even if reproduction data at sound linking point is processed with previous-value hold or interpolation.

8 Claims, 11 Drawing Sheets

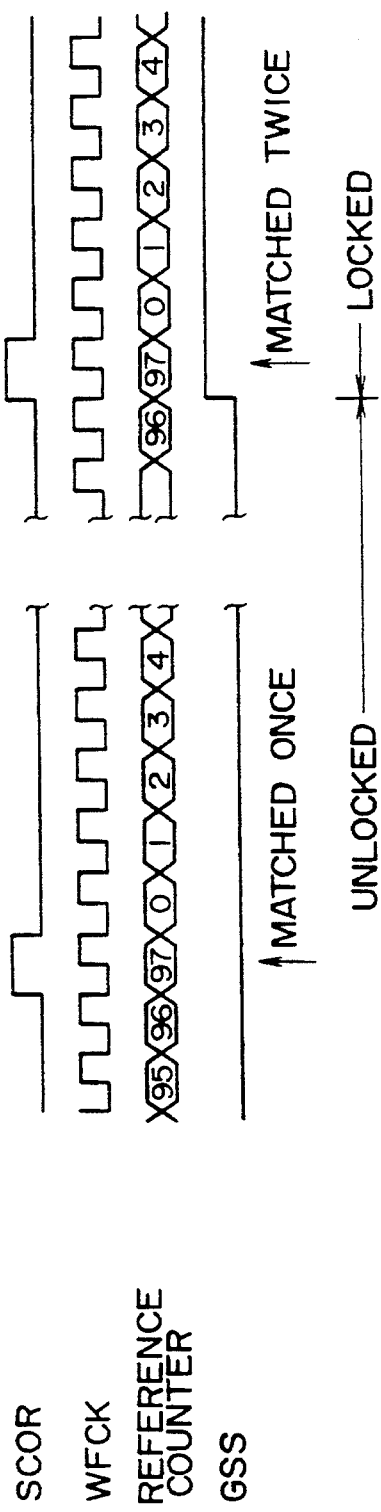
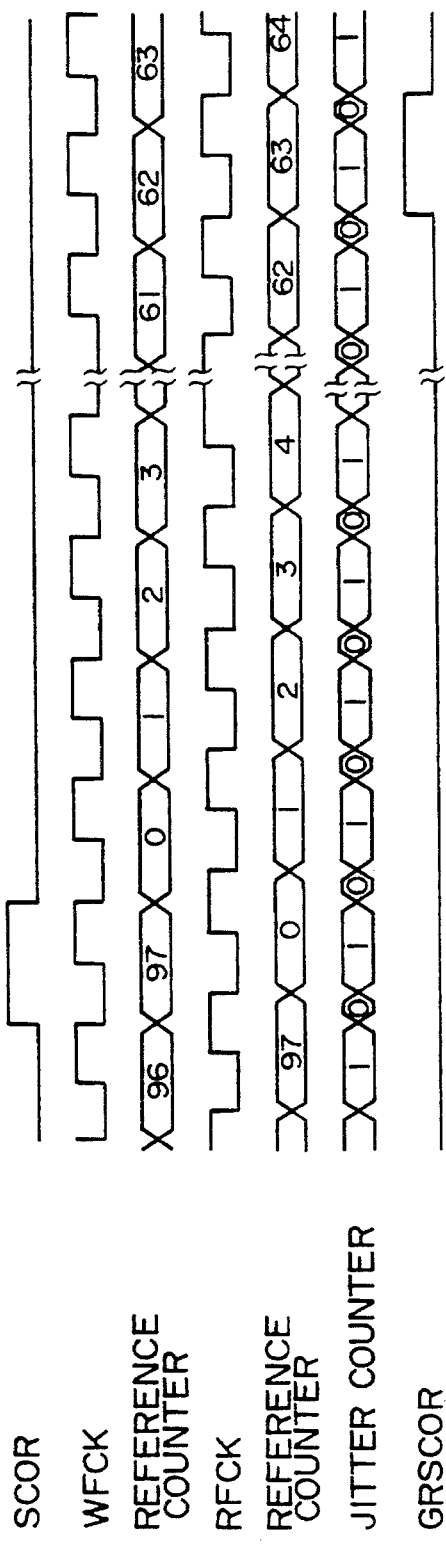

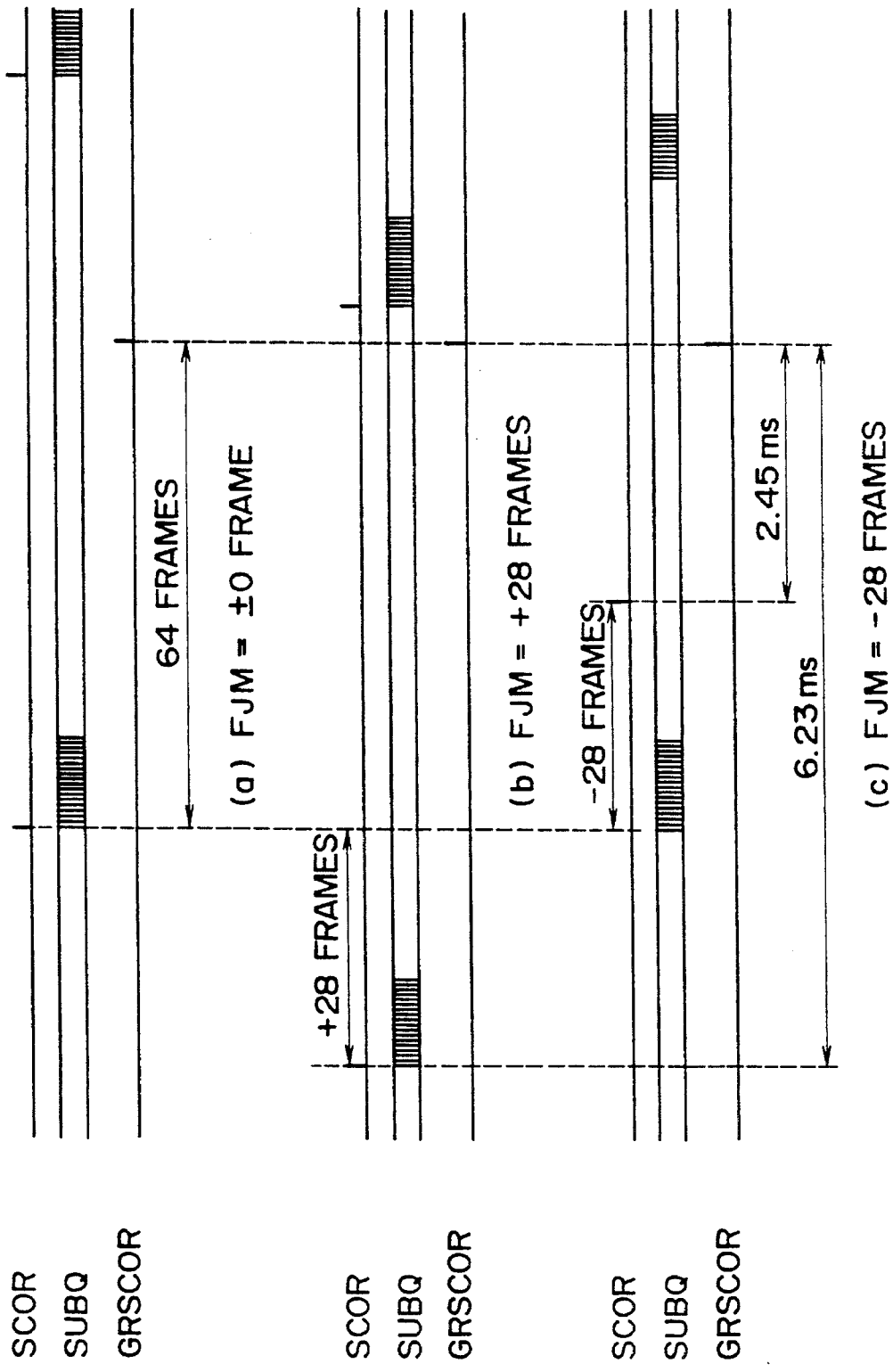

FLOWCHART FOR DATA DETERMINATION

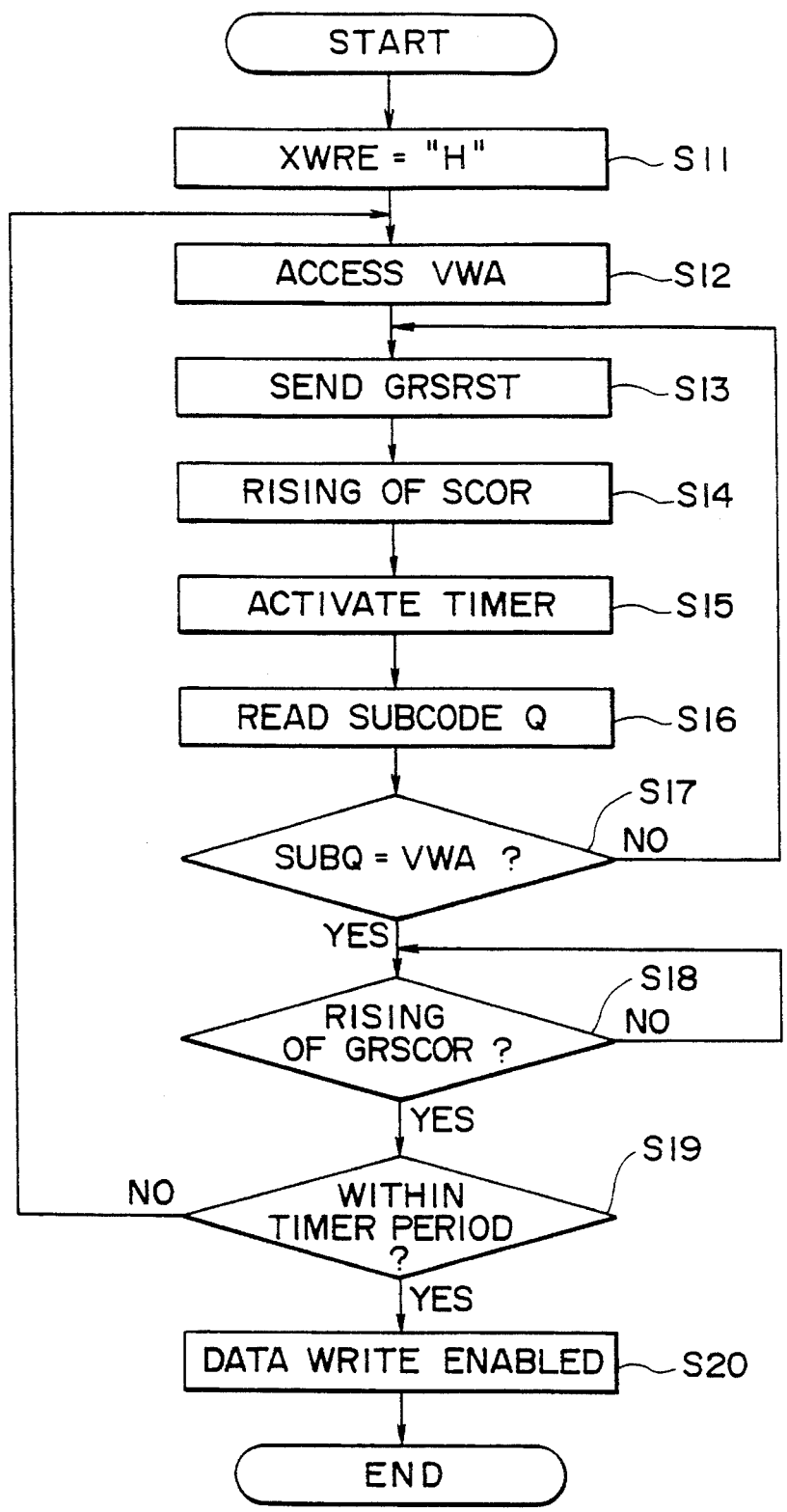

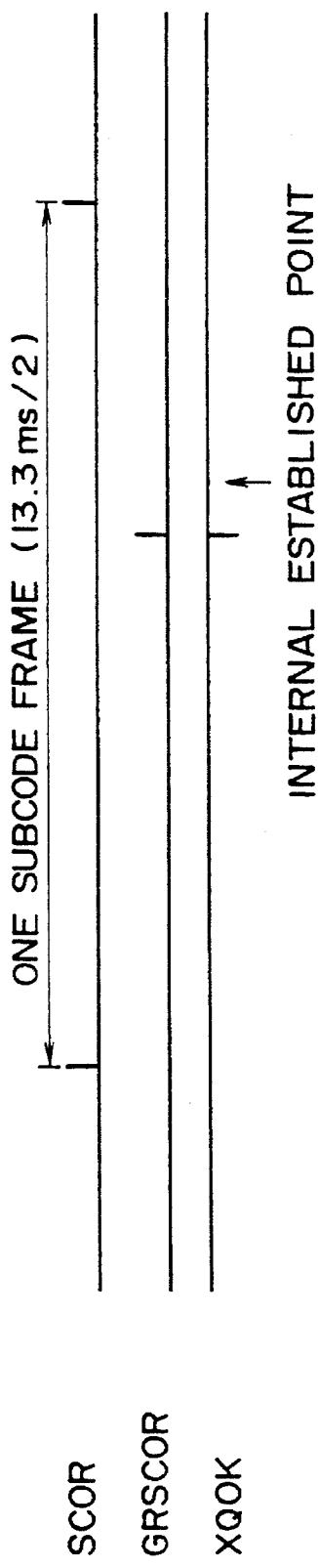
FIG. 10a TIMING CHART FOR DATA DETERMINATION: OVERALL DIAGRAM OF ESTABLISHED POINT
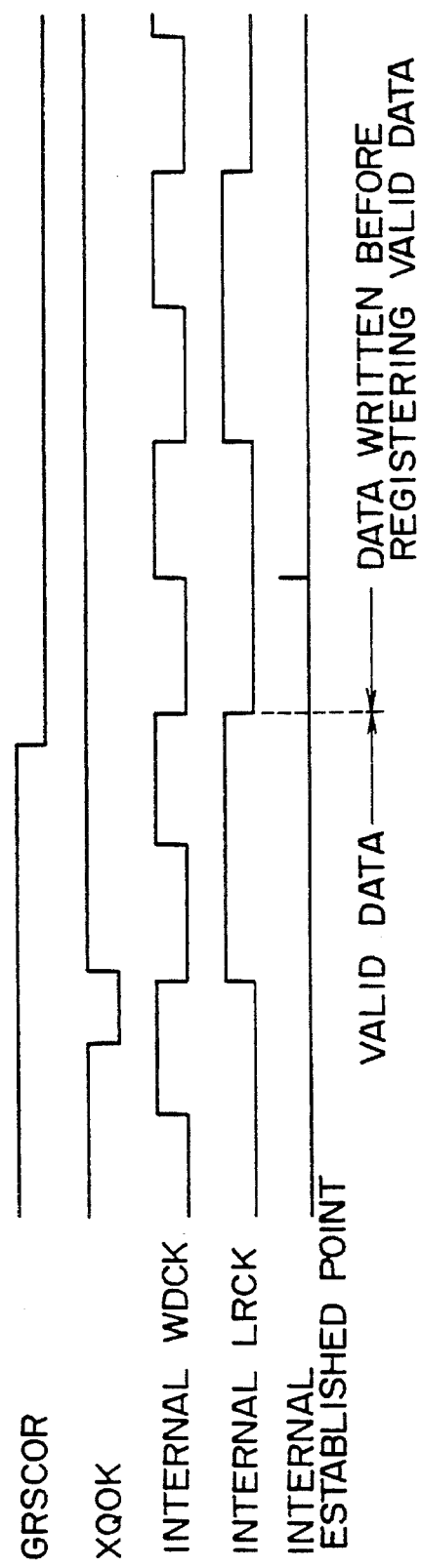
FIG. 10b TIMING CHART FOR DATA DETERMINATION: EXPANDED VIEW OF ESTABLISHED POINT

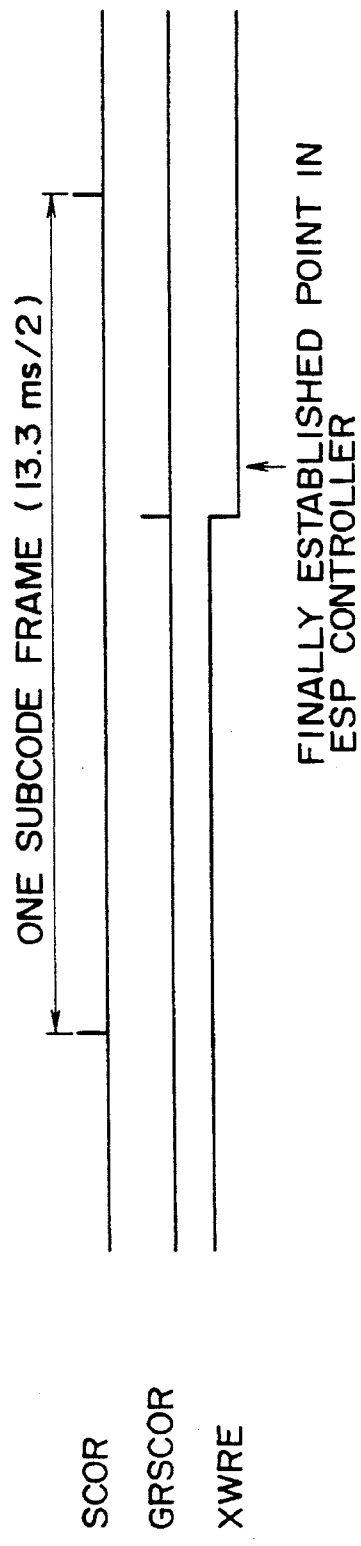
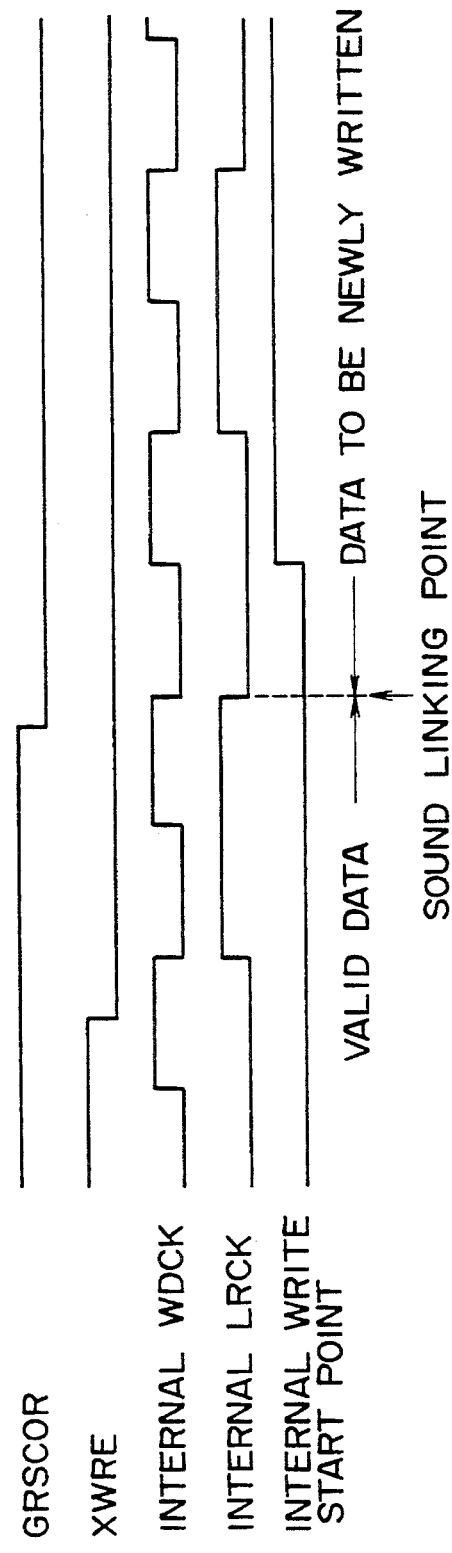

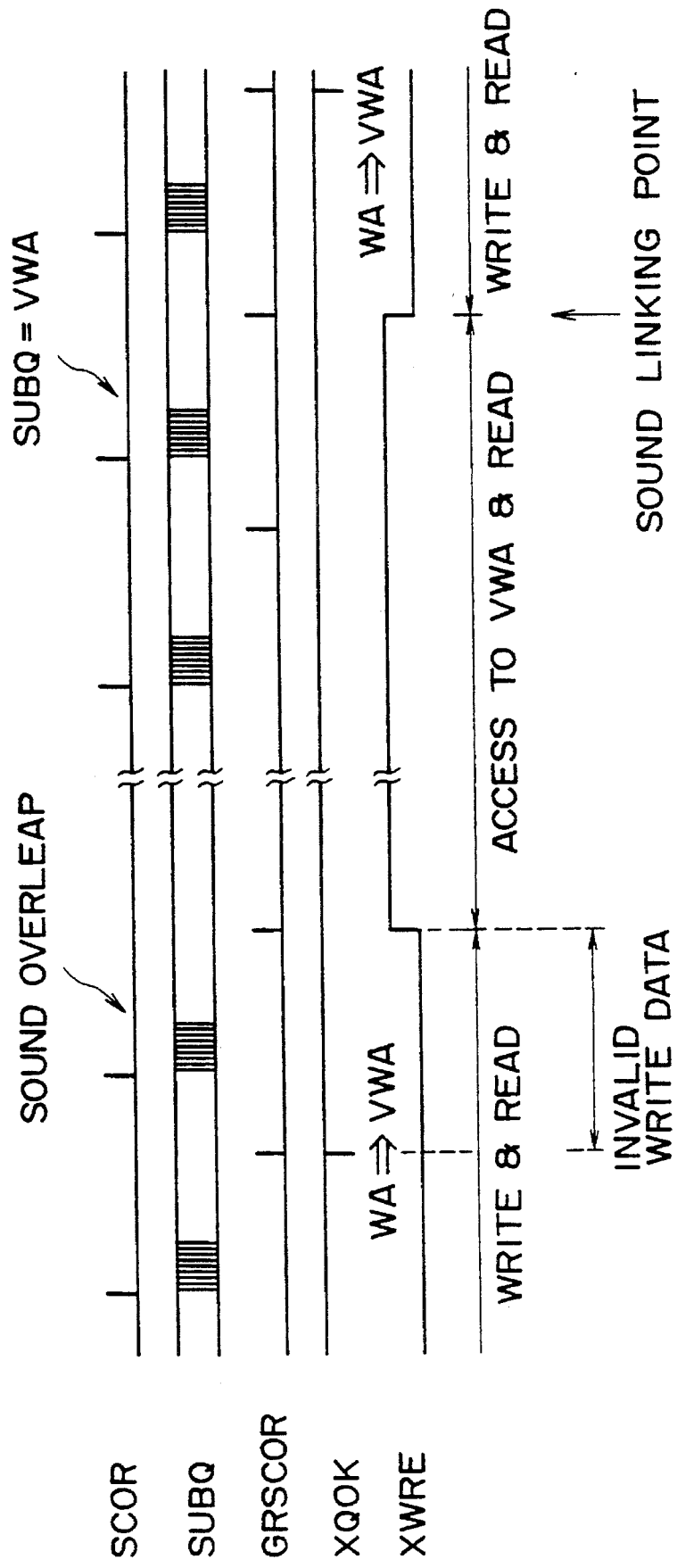

TIMING CHART FOR WRITING SUBCODE Q

TIMING CHART FOR READING SUBCODE Q

OPTICAL DISC PLAYER WITH SHOCKPROOF CONTROLLER AND METHOD OF PROCESSING REPRODUCTION DATA

BACKGROUND OF THE INVENTION

The present invention relates to a disc player for reproducing information from a digital audio disc, such as a compact disc (CD) or a mini disc (MD) and reproducing an information-recorded disc such as a CD-ROM disc (the discs are hereinafter generically referred to simply as discs"). More particularly, this invention relates to a disc player having a constitution in which reproduction data read from a disc are stored in a large-capacity memory to be read for output, and to a method of processing the reproduction data.

Some disc players, such as certain CD players have an anti-shock constitution for preventing, by assuring continuity of PCM (Pulse Code Modulation) data, a so-called sound skip from occurring when a so-called track jump caused by an external disturbance such as an undue vibration or shock is applied to the player during a disc playback operation. The term "track jump" as used herein denotes that an information reading light spot projected from an optical pick-up for reading recorded information by tracing a record track (a pit train) on a disc jumps off or over a track or tracks.

In an ordinary CD player, or a CD player that is not shock-proofed, a data rate of reproducing data from a disc is substantially the same as a data rate of an ultimate audio output. On the contrary, in a shock-proof CD player, a disc rotates at a speed, for example, about twice as high as a speed of disc rotation in the ordinary disc player, thereby reading recorded PCM data at an accordingly higher speed than a data reading speed of the ordinary disc player. The PCM data thus read are temporarily stored in a large-capacity DRAM (Dynamic Random Access Memory) and are read from the DRAM at the reproducing data rate of the ordinary disc player to produce an output.

If a track jump occurs during disc reproduction, the information reading light spot of the pick-up is returned to a position immediately before a position at which the track jump occurred, restarting reproduction from the former position. Since the PCM data is established based on a subcode synchronizing signal having a wow caused by a spindle-drive motor, a data determination signal comes to have the wow, making it uncertain where in a one subcode frame the data is established. Consequently, it is required to set a window for a one frame jitter margin in which the PCM data coming from the disc is compared with the PCM data coming from the DRAM for a match to perform sound linking processing on the PCM data.

However, in the above-mentioned conventional disc player, if a track jump occurs due to an external disturbance such as undue vibration or shock, the sound linking processing is made by comparing the PCM data, thereby involving one or more of the following problems:

(1) When it is attempted to perform linking processing on software having successive fixed patterns, the match is found as soon as the data entered the comparison window, thereby making it highly possible to link sounds at a point at which no sound linking should occur; and (2) If either PCM data coming from the DRAM or PCM data coming from the disc is processed with an error correction such as a previous-value hold and interpolation, linking processing cannot be performed on the PCM data, thereby making it possible that sounds are never linked.

OBJECTS AND SUMMARY OF THE INVENTION

It is therefore an object of the present invention to provide a disc player and a processing method of reproduction data used on the disc player, the disc player being capable of correctly performing sound linking processing on software having successive fixed patterns and implementing sound linking without involving an error if PCM data at a sound linking point is processed with a previous-value hold or interpolation for error correction.

In carrying out the invention and according to one aspect thereof, there is provided a disc player constituted so that reproduction data read from a disc are temporarily stored in a large-capacity memory and then read from the memory for output. The disc player according to the invention comprises a jitter detector for detecting an amount of jitter in a second clock synchronized with the reproduction data as opposed to a first clock having a fixed frequency, a counter for counting the second clock for 98 frames, an adder/subtractor for adding or subtracting the amount of jitter to or from an output of the counter, and an offset circuit for providing an offset for a predetermined number of frames to an output of the adder/subtractor, wherein the reproduction data are written to the large-capacity memory based on an output of the offset circuit.

In carrying out the invention and according to another aspect thereof, there is provided a disc player comprising a match detector for detecting a match at predetermined times consecutively between a subcode synchronizing signal obtained from the reproduction data (hereinafter referred to as a "reproduction subcode synchronizing signal") and the output of the counter and an output determination circuit for making valid the output of the offset circuit only when the match is detected by the match detector.

In carrying out the invention and according to still another aspect thereof, there is provided a disc player constituted so that the reproduction data read from the disc are temporarily stored in a large-capacity memory and then read from the memory for output, the disc player having a memory for reproduction data time information corresponding to the reproduction data to be written to the mass memory.

In carrying out the invention and according to yet another aspect thereof, there is provided a disc player constituted so that the reproduction data time information is stored in the above-mentioned memory in a thinned out manner.

In carrying out the invention and according to another aspect thereof, there is provided a reproduction data processing method for generating a subcode synchronizing signal synchronized with a clock having a fixed frequency, reading time information of a subcode contained in the reproduction data in synchronization with the subcode synchronizing signal obtained from the reproduction data to detect a sound overleap based on the time information and a finally established address in the large-capacity memory, and, if no sound overleap has been detected, determining the reproduction data to be stored in the large-capacity memory based on the subcode synchronizing signal, in a disc player constituted to write the reproduction data coming from a disc to the large-capacity memory and then read the data from the large-capacity memory for output.

In carrying out the invention and according to still another aspect thereof, there is provided a reproduction data processing method for accessing the finally determined address if the sound overleap has been detected in the above-mentioned reproduction data processing method, reading the time information of the subcode in synchronization with the reproduction subcode synchronizing signal to compare the time information of the subcode with the finally established address, and, if a match is found between the time information of the subcode and the finally established address, writing the reproduction data to the large-capacity memory based on the subcode synchronizing signal.

In the disc player according to the invention, an amount of jitter in a reproduction clock relative to a fixed clock is detected, the obtained jitter amount is added to or subtracted from a count output obtained by counting the reproduction clock by the number of times for 98 frames, and an offset for the predetermined number of frames is applied to the result of the addition or subtraction to generate a subcode synchronizing signal synchronized with the fixed clock. Based on the generated subcode synchronizing signal, the reproduction data is written to the large-capacity memory, thereby implementing data determination by time axis and sound linking on time axis.

In the disc player according to the invention, the reproduction subcode synchronizing signal coming from the disc is compared with the count output of the fixed clock to make valid the subcode synchronizing signal generated only when the match has been found by the predetermined number of times consecutively, thereby eliminating a false reproduction subcode synchronizing signal caused by a scratch or the like on the disc to determine a true reproduction subcode synchronizing signal. As a result, the subcode synchronizing signal can be generated without being affected by a scratch or the like on the disc.

In the disc player according to the invention, the time information of the reproduction data to be written to the large-capacity memory is stored in the memory provided to store the time information, thereby providing the time information of the reproduction data. Consequently, it is unnecessary to perform processing of time conversion while monitoring a storage amount of the large-capacity memory, which is required conventionally, thereby mitigating a software load of a microcomputer used in the system and implementing a real-time display of the time information.

In the disc player according to the invention, the time information is stored in the memory in a thinned out manner. For example, addresses of the memory are made common with upper addresses of the large-capacity memory to link the reproduction data with its time information. This setup provides the time information of the reproduction data with a minimum memory capacity.

In the reproduction data processing method according to the invention, the subcode synchronizing signal synchronized with the fixed clock is generated and, if no sound overleap has been detected, the generated subcode synchronizing signal is used to establish reproduction data to be stored in the large-capacity memory.

In the reproduction data processing method according to the invention, if a sound overleap occurs, writing of the reproduction data to the large-capacity memory starts based on the generated subcode synchronizing signal, thereby implementing sound linking on the time axis. Consequently, if reproduction data at a sound linking point is processed with a previous-value hold or interpolation, sounds can be linked without error. Also, in software in which fixed patterns continue, sounds can be linked correctly.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 5 is a timing chart for describing match detecting operations in the subcode synchronizing signal generator;

FIG. 6 is a timing chart obtained when a frame jitter margin in the subcode synchronizing signal generator is ±0;

FIG. 7 is a timing chart for describing a state in which frame jitter margins are changed;

FIG. 9 is a flowchart describing a procedure for sound linking;

FIGS. 10a to 10b are timing charts describing a state in which data is established;

FIGS. 11a and 11b are timing charts describing a state in which sounds are linked;

FIG. 12 is a timing chart describing a series of operations from sound overleap detection to sound linking;

DESCRIPTION OF THE PREFERRED EMBODIMENTS

This invention will be described in further detail by way of example with reference to the accompanying drawings.

Figure 1:
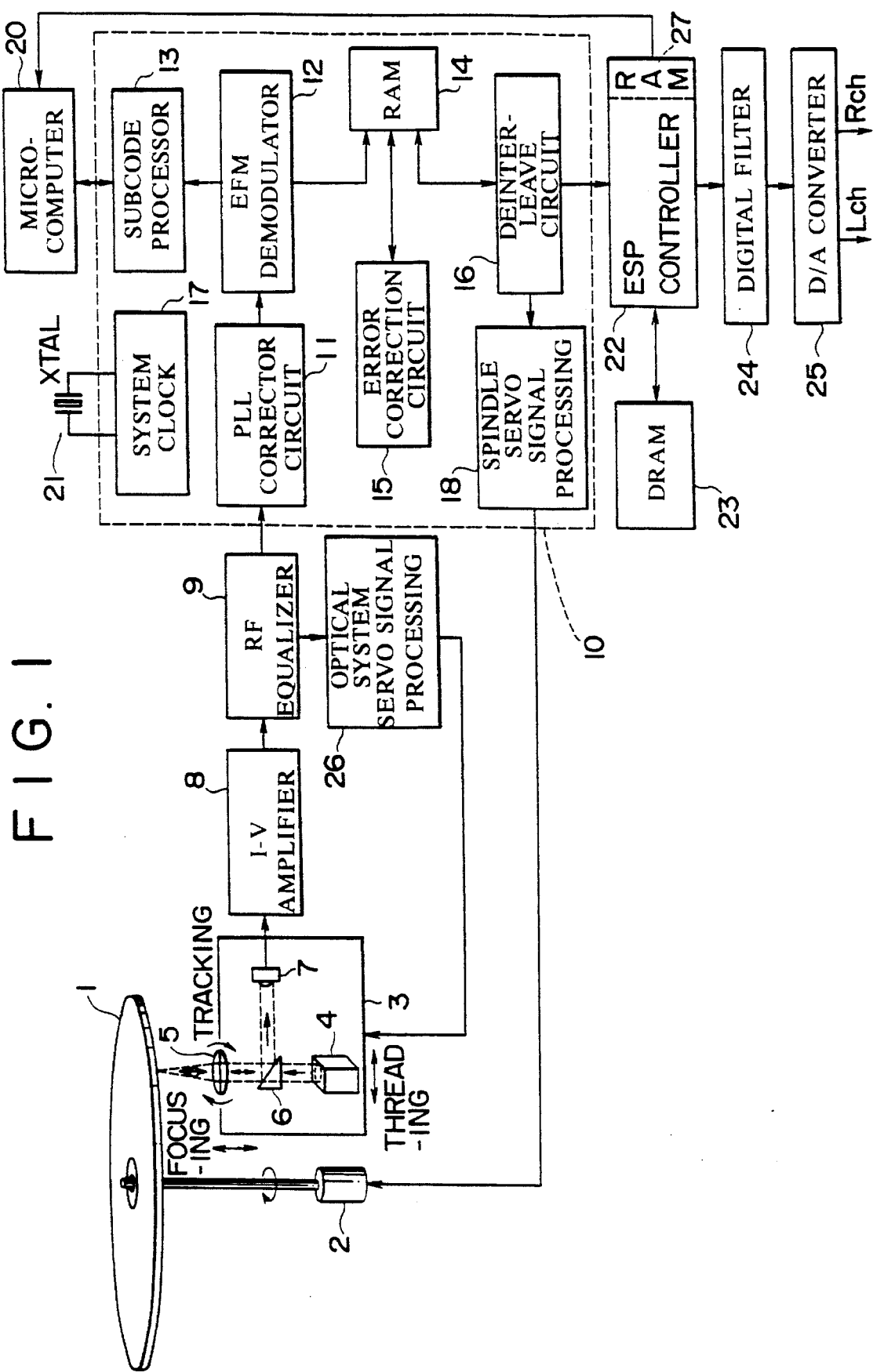
FIG. 1 is a block diagram illustrating a constitution of a control system of a CD player practiced as one preferred embodiment of the invention.

Referring to FIG. 1, there is shown a block diagram illustrating a control system of a CD player practiced as one preferred embodiment of the invention. In the figure, a disc (CD) 1 is rotatively driven by a spindle-drive motor 2. Information recorded on the disc 1 is read with an optical pick-up 3 (hereinafter referred to simply as a pick-up).

The pick-up 3 comprises a laser diode 4, an objective lens 5 for focusing a laser beam coming from the laser diode 4 onto a signal recorded side of the disc 1 as an information reading light spot, a polarized beam splitter 6 for changing a direction in which a reflected light beam coming from the disc 1 goes, and a photo detector 7 for receiving the reflected light beam. The pick-up 3 is moved in the radial direction of the disc 1 by a thread feed motor, not shown.

The pick-up 3 further contains a tracking actuator, not shown, for deflecting the information reading light spot in the disc radial direction relative to a record track provided on the disc 1 and a focus actuator, not shown, for moving the objective lens 5 in its optical axis direction. An output signal of the pick-up 3 is converted by an I(current)/V(voltage) amplifier 8 from a current signal to a voltage signal. The resultant voltage signal is shaped by an RF equalizer 9 to be fed to a DSP (Digital Signal Processor) circuit 10.

Signal processing in the DSP circuit 10 is performed as follows. First, asymmetry correction is performed in a PLL (Phase Locked Loop) asymmetry correction circuit 11 to provide a binary output signal. Based on an edge of the binary signal, continuous reproduction clocks are generated according to a constitution of the PLL. The term "asymmetry" herein denotes a state in which the center of an eye pattern of an RF signal deviates from the center of oscillation.

Then, in an EFM (Eight-to-Fourteen Modulation) demodulator 12, EFM is demodulated to provide PCM data of digital audio and a parity for error correction and detection. At the same time, a subcode entered immediately after a subcode synchronizing signal SCOR is demodulated. The subcode demodulated in the EFM demodulator 12 is fed to a microcomputer 20 via a subcode processor 13. The microcomputer 20 controls the system in its entirety.

The PCM data after EFM demodulation is stored in a RAM (Random Access Memory) 14 once, error-corrected in an error correction circuit 15 based on an error correction and detection parity, and deinterleaved of CIRC (Cross Interleave Reed-Solomon Code) in a deinterleave circuit 16. It should be noted that the DSP circuit 10 contains a clock generator for generating a system clock based on an output of a crystal resonator 21 and performs signal processing based on the generated system clock. In the RAM 14, a reproduction clock generated in the PLL asymmetry correction circuit 11 as a write clock WFCK is used, and the above-mentioned system clock is used as a read clock RFCK.

The PCM data passed through the DSP circuit 10 is stored in a large-capacity DRAM 23 via an ESP (Electric Shock Proof) controller 22. The PCM data stored in the DRAM 23 is read through the ESP controller 22. The read PCM data is then filtered by a digital filter 24, converted by a D/A converter 25 to analog data, and outputted as L-channel and R-channel audio outputs.

The DRAM 23 is used to assure continuity of the PCM data to prevent sound overleap from occurring when a track jump has taken place due to an external disturbance such as an undue shock during playback. To be more specific, when a track jump has taken place, the microcomputer returns the information reading light spot of the pick-up 3 to a position at which the spot was projected immediately before the occurrence of the track jump to restart the reproduction, while the ESP controller 22 links the PCM data to be obtained after the restart of the reproduction with the PCM data stored in the DRAM 23 that was present immediately before the occurrence of the track jump. A specific constitution and function of the ESP controller 22 will be described later in more details.

The DSP circuit 10 is provided with a spindle servo signal processing circuit 18 for controlling the rotation of the spindle-drive motor 2 based on a phase difference between a reference clock and the reproduction clock. An optical system servo signal processing circuit 26 controls servo systems associated with operation of the pick-up 3: that is, a tracking servo system for making the information light spot follow the track on the disc 1; a focus servo system for keeping the light spot always focused on the signal recorded surface of the disc 1; and a thread servo system for controlling the position of the pick-up 3 in the radial direction of the disc 1.

The spindle servo signal processing circuit 18 drives, normally in a low-speed mode, the spindle-drive motor 2 for rotating the disc 1, and when a track jump occurs, drives the spindle-drive motor 2 in a high-speed mode. In the high-speed mode, when the DRAM 23 becomes full, the spindle servo signal processing circuit 18 drives the spindle-drive motor 2 in the low speed mode again. In the low-speed mode, the spindle-drive motor 2 is driven at a normal rotational speed of a CD player (or a normal speed). In the high-speed mode, the spindle-drive motor 2 is driven at a speed twice as high for example.

The constitution and function of the ESP controller 22 will be described as follows. First, the ESP controller 22 controls PCM data read/write operations on the DRAM 23. Addresses for accessing data stored in the DRAM 23 include a data read address RA and a data write address WA. The data read address RA is incremented based on a clock generated inside the ESP controller 22, while the data write address WA is incremented based on a clock outputted from the DSP circuit 10.

Here, it should be noted that PCM data written to the DRAM 23 based on the clock coming from the DSP circuit is not always correct. Therefore, it is required to check a subcode or the like of the PCM data for a sound overleap. The microcomputer 20 checks a Q channel (hereinafter referred to as a subcode Q) of a subcode supplied from the subcode processing circuit 13 of the DSP circuit 10 for a sound overleap caused by a track jump due to external disturbance such as a shock or a vibration.

Figure 2:
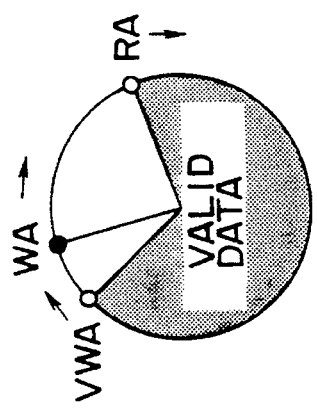
FIG. 2 is a diagram illustrating a valid data area in the DRAM.
Figure 3D:
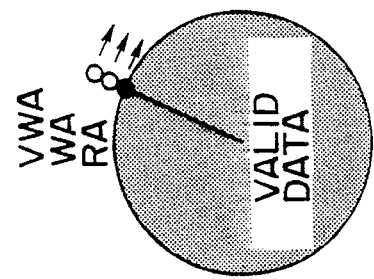
FIGS. 3a to 3d are diagrams illustrating relationships between a write address WA, a read address RA, and a valid address VWA in the DRAM.
Figure 3C:
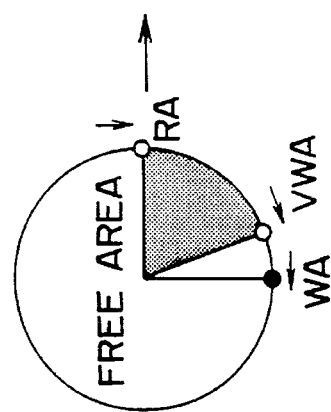
Figure 3B:
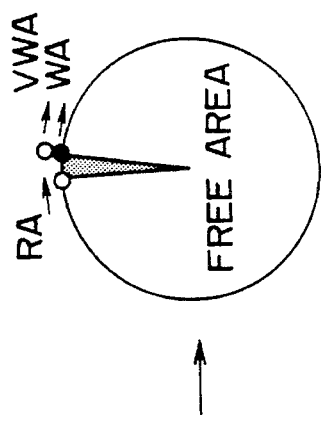
Figure 3A:
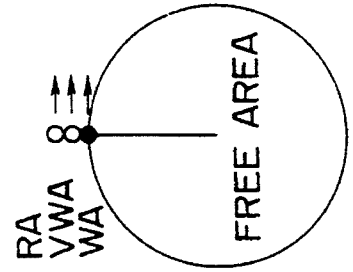

Upon receiving an output from the microcomputer 20 telling of detection of no sound overleap, the ESP controller updates a last address of the PCM data written to the DRAM 23 as a valid (or established) address VWA. Namely, referring to FIG. 2, an area between the valid address VWA and the read address RA is a data area having no sound overleap. The data in this area is handled as valid data.

Referring to FIGS. 3A to 3D there is shown a relationship between the read address RA, the write address WA, and the valid address VWA in the DRAM 23. First, the write address WA advances starting from an initial state of FIG. 3 (a) twice as fast as the read address RA, data is written by the write address WA, registered by the valid address VWA, and sequentially read by the read address RA (FIG. 3 (b)).

If the write operation is not interrupted by a sound overleap or other causes, the write address WA eventually catches up the read address RA by passing through a state as shown in FIG. 3 (c). When the DRAM is full with data, the write operation is disabled (FIG. 3 (d)). Thus, when the DRAM 23 is full with data and there is no more room to write data or if a sound overleap caused by a scratch on the disc or an external disturbance is detected, writing of the PCM data to the DRAM 23 is discontinued. Restarting the writing requires continuity of the PCM data.

To ensure the continuity of the PCM data, the ESP controller goes back to the last valid address. On the other hand, the microcomputer 20 returns the pick-up 3 to the position immediately before the position at which the track jump has occurred to restart the reproduction from that position and, at the same time, reads the subcode Q at the rising of the reproduction subcode synchronizing signal SCOR to compare the subcode Q with the valid address held in the microcomputer itself. Then, if a match is found between both addresses, the ESP controller 22 restarts the writing when a subcode synchronizing signal GRSCOR to be generated within 2.45 ms to 6.23 ms is a at HIGH level, i.e., the signal GRSCOR to be described later.

Figure 4:
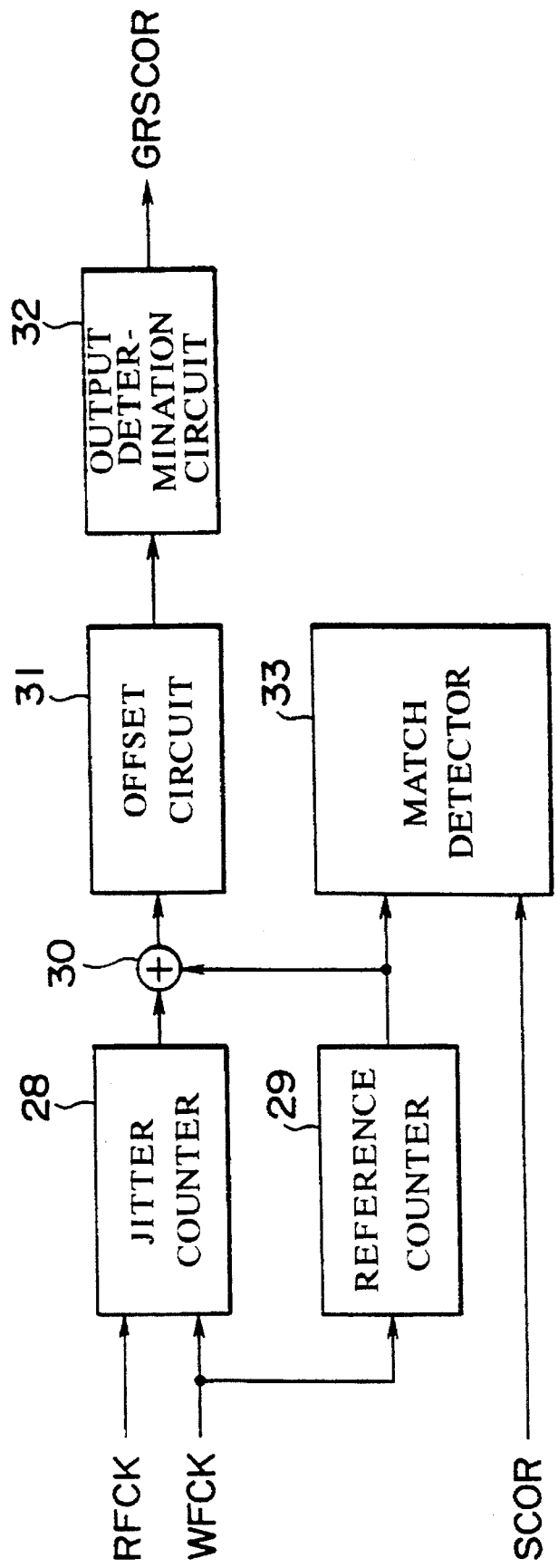
FIG. 4 is a block diagram illustrating an example of a constitution of a subcode synchronizing signal generator.

Because the above-mentioned sound linking processing is performed on a subcode frame basis, implementation of the sound linking on a time axis requires to eliminator signal in the reproduction subcode synchronizing signal SCOR, the wow caused by the spindle-drive motor 2. For the elimination, the ESP controller 22 is provided with a subcode synchronizing signal generator for generating the subcode synchronizing signal GRSCOR cleared of the wow caused by the spindle-drive motor 2. FIG. 4 shows an example of constitution of this subcode synchronizing signal generator.

Referring to FIG. 4, a jitter counter 28 measures a jitter amount of the write clock WFCK or the reproduction clock coming from the disc 1 as opposed to the read clock RFCK or the fixed clock. A reference counter 29 counts the write clock WFCK for 98 frames. By means of an adder/subtractor 30, a count output of the reference counter 29 is added to or subtracted from the jitter amount measured by the jitter counter.

Then, an offset for 64 frames for example is given to an addition/subtraction output by an offset circuit 31. Thus, subtracting the measured jitter amount from the count output of the write clock WFCK for 98 frames and applying a correction in time axis to the reproduction subcode synchronizing signal SCOR containing the wow caused by the spindle-drive motor can eliminate the wow from the reproduction subcode synchronizing signal SCOR, thereby generating the subcode synchronizing signal GRSCOR synchronized with the PCM data read from the DRAM 23 based on the read clock RFCK having a crystal resonator precision.

On the other hand, a match detector 33 detects a match between the reproduction subcode synchronizing signal SCOR coming from the DSP circuit 10 and the count output of the reference counter 29. If the match is found twice consecutively for example as shown in FIG. 5, the match detector 33 sends a match detect signal GSS to an output determination circuit 32 and is locked. Upon reception of the match detect signal GSS, or when the match between the reproduction subcode synchronizing signal SCOR and the count output of the reference counter has been found twice consecutively, the output determination circuit 32 outputs the generated subcode synchronizing signal GRSCOR.

When the match detector 33 is locked once, the match detector is thereafter kept locked until a reset signal comes from the microcomputer 20 or a signal GTOP to be outputted when a frame sync signal is resynchronized by the DSP circuit 10 goes to a HIGH level. While the match detector is locked, a subcode synchronizing signal GRSCOR is kept outputted. When the RAM 14 of the DSP circuit 10 overflows, the ESP controller 22 once resets the read clock RFCK and the measured jitter amount of the write clock WFCK to perform the measurement again.

Thus, by detecting the match twice consecutively for example between the reproduction subcode synchronizing signal SCOR and the count output of the reference counter 29, a false reproduction subcode synchronizing signal generated by a scratch or the like on the disc 1 can be eliminated, thereby enabling to determine the true reproduction subcode synchronizing signal SCOR. FIG. 6 shows a timing chart obtained when a frame jitter margin (FJM) is λ0 in a subcode synchronizing signal generator having the above-mentioned constitution.

The reason why an offset for 64 frames is given on the read clock RFCK by the offset circuit 31 in a period of time from the rising of the reproduction synchronizing signal SCOR and the rising of the subcode synchronizing signal GRSCOR will be described below. Depending on the constitution of the DSP circuit 10, the jitter frame margin extends over 28 frames. Here, the reproduction subcode signal SCOR is assumed for reading the subcode Q in the microcomputer 20 and the subcode synchronizing signal GRSCOR is assumed for performing sound linking within subcode frames.

When performing sound linking, the microcomputer 20 accesses a position immediately preceding the occurrence of a track jump, always compares the established address owned by the microcomputer with the subcode Q being read from the disc 1, and determines a point for sound linking. That is, the microcomputer 20 must determine whether to perform sound linking or not by reading the subcode Q at the rising of the reproduction subcode synchronizing signal SCOR and comparing the read subcode Q with the established address.

Referring to FIG. 7, there is shown a timing chart obtained when the frame jitter margin is maximized (+28 frames) and minimized (−28 frames). In FIG. 7, a time between the rising of the reproduction subcode synchronizing signal SCOR and the rising of the subcode synchronizing signal GRSCOR is a minimum of 2.45 ms and a maximum of 6.23 ms. Namely, in sound linking, it is most critical for the microcomputer 20 when the frame jitter margin is −28 frames. During this 2.45 ms, the microcomputer must read the subcode Q to compare it with the established address to determine whether to perform sound linking or not.

Figure 8:
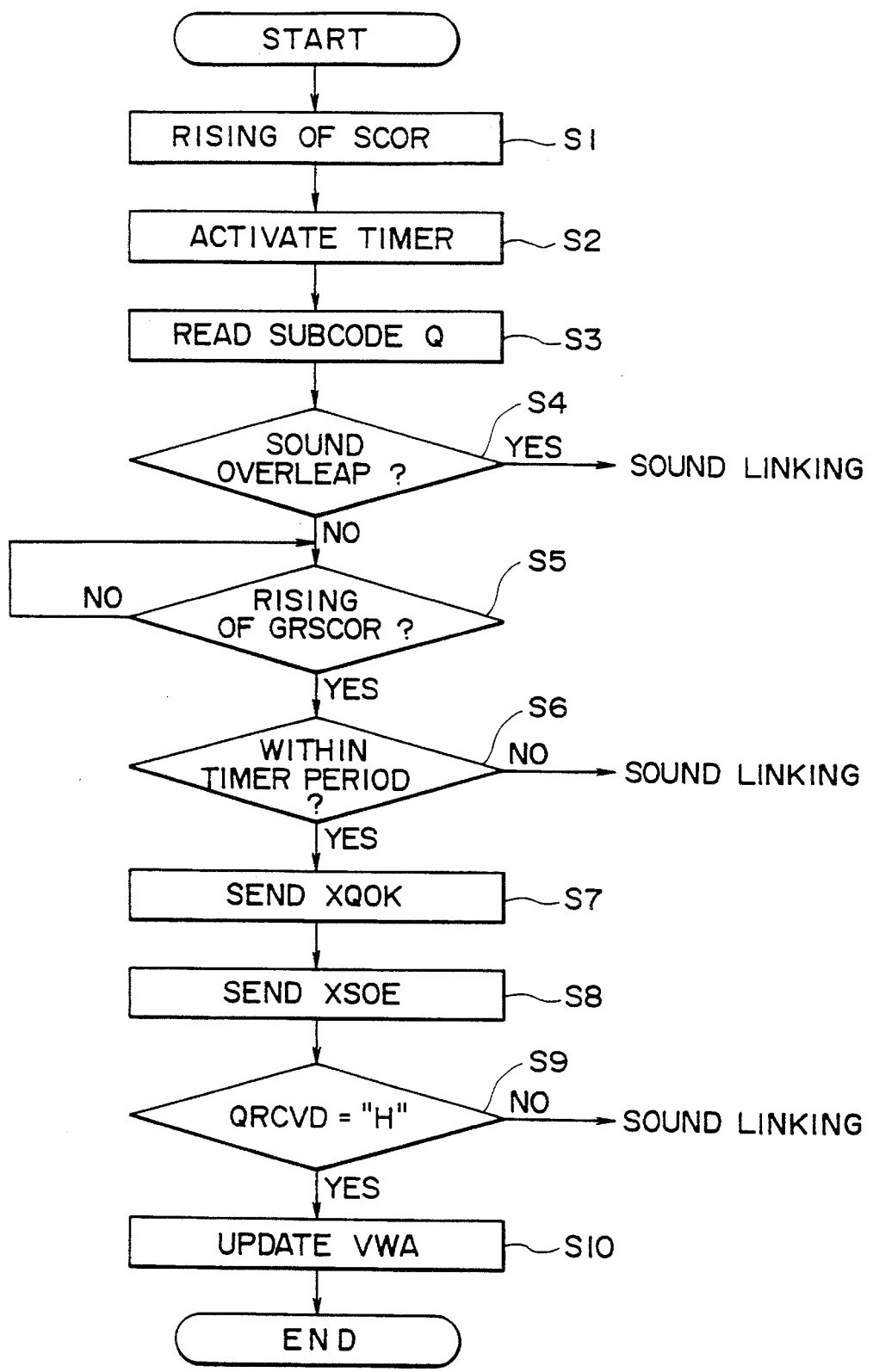
FIG. 8 is a flowchart describing a procedure for data determination.

Next, processing procedures for establishing data and linking sounds will be described. First, the data establishing procedure will be described with reference to a flowchart of FIG. 8. Upon detection of the rising of the reproduction subcode synchronizing signal SCOR (step S1), the microcomputer 20 activates a built-in timer (step S2) and reads the subcode Q (step S3).

Then, the microcomputer compares a difference between the read subcode Q and the previously established address to determine whether a sound overleap has taken place or not (step S4). If the sound overleap has been detected, the microcomputer 20 passes control to a sound linking routine to be described later. If no sound overleap has been detected, the microcomputer 20 monitors the rising of the subcode synchronizing signal GRSCOR (step S5). Upon detection of the rising of the subcode synchronizing signal GRSCOR, the microcomputer 20 determines, based on a time measured by the above-mentioned timer, whether the subcode synchronizing signal GRSCOR has come between 2.45 ms and 6.23 ms (step S6).

If the subcode synchronizing signal GRSCOR has not come between 2.45 ms and 6.23 ms, then the microcomputer 20 passes control to the sound linking routine. If the GRSCOR has come during that period of time, sends a registration permit signal XQOK (about 68 μs) to the ESP controller 22 while the subcode synchronizing signal GRSCOR is HIGH (step S7). When the registration permit signal XQOK has come to the microcomputer 20 while the subcode synchronizing signal GRSCOR is HIGH, the ESP controller 22 loads the write address WA in the valid address VWA to establish the data. It should be noted here that a point to be established by the ESP controller is always fixed within one subcode frame as shown in FIG. 10.

Having sent the registration permit signal XQOK, the microcomputer 20 then sends a confirmation request signal XSOE to the ESP controller 22 to confirm whether the registration has been made correctly (step S8). When the data has been registered correctly, the ESP controller 22 returns a registration complete signal QRCVD of HIGH level in response to the SXOE signal. The microcomputer 20 waits for the return of the QRCVD signal from the ESP controller 22 (step S9). If the QRCVD is not HIGH, the microcomputer 20 passes control to the sound linking routine. If the QRCVD is HIGH, the microcomputer 20 updates the valid address VWA (step S10), thereby ending the series of processing operations for the data establishment.

The, the sound linking processing is described with reference to a flowchart of FIG. 9. First, the microcomputer 20 makes HIGH a write enable signal XWRE for enabling the writing of data to the DRAM 23 at LOW level, thereby disabling the writing (step S11). Then, the microcomputer 20 accesses the final valid address VWA (step S12) and sends a SCOR resynchronizing signal GRSRST to the ESP controller 22 (step S13). In the ESP controller 22, the match detector 33 of the subcode synchronizing signal generator (FIG. 4) is reset by the SCOR resynchronizing signal GRSRST.

Subsequently, upon detection of the rising of the reproduction subcode synchronizing signal SCOR (step S14), the microcomputer 20 activates the incorporated timer (step S15) to read the subcode Q (step S16). Then, the microcomputer 20 determines whether the subcode Q matches the final valid address VWA (step S17). If no match is found, the microcomputer returns to step S14 to repeat the above-mentioned processing operations.

If the subcode Q and the final valid address VWA are found matching, the microcomputer 20 monitors the rising of the subcode synchronizing signal GRSCOR (step S18). Upon detection of the rising of the subcode synchronizing signal GRSCOR, the microcomputer 20 determines, based on the time measured by the timer, whether the subcode synchronizing signal GRSCOR has come within a period of time between 2.45 ms and 6.23 ms (step S19). If the subcode synchronizing signal GRSCOR has not come within the period of time between 2.45 ms and 6.23 ms, the microcomputer returns to step S12 to repeat the above-mentioned processing operations.

On the other hand, if the GRSCOR signal has been found coming within the above-mentioned period of time, the microcomputer 20 makes LOW the above-mentioned write enable signal XWRE while the subcode synchronizing signal GRSCOR is HIGH, thereby permitting the ESP controller to write the data to the DRAM 23 (step S20). This causes the ESP controller 22 to start writing the PCM data read from the disc 1 to the DRAM 23 when the established point of the subcode frame has been reached as shown in FIG. 11. As a result, the continuity of the PCM data is ensured, thereby implementing sound linking. FIG. 12 shows a timing chart describing the series of operations ranging from the detection of sound overlap to the sound linking.

Meanwhile, the ESP controller 22 incorporates a RAM 27 dedicated to the subcode Q as shown in FIG. 1. This RAM is provided to store the time information of reproduction data. However, because it is impractical to store in the RAM 27 all the time information corresponding to the PCM data stored in the external DRAM 23 in terms of storage capacity, the time information to be stored in the RAM 27 are thinned out to some extent in the present embodiment. In what follows, the thinning out will be described on the supposition that the external DRAM 23 has a storage capacity of 16M bits.

A symbol of 16 bits can be written to the DRAM 23M times. Because the symbol is written twice for each of the left and right channels on a sampling frequency fs (=44.1 kHz), PCM data equivalent to the following value can be stored in the DRAM 23 to its full:

$$(1/44.1 \text{ kHz}) \times (1/2) \times 1024 \times 1024 \approx 11.889 \text{ s} \quad (1)$$

Until the DRAM 23 is full, the following number of subcode frames come:

$$11.889 \text{ s}/13.333 \text{ ms} \approx 892 \text{ subcode frames} \quad (2)$$

Now, it is supposed that all the time information corresponding to the external DRAM 23 are written with the data to be written to the RAM 27 in the ESP controller 22 restricted to one byte of TNO (tempo number), one byte of IND (index), one byte of MIN (minute) and one byte of SEC (second) of the subcode Q per subcode frame. Then, a RAM having the following storage capacity is required, making the implementation of such a RAM impractical:

$$892 \times 8 \text{ (1 byte)} \times 4 \text{ (TNO/IND/MIN/SEC)} = 28544 \text{ bits} = 28 \text{ Kbits} \quad (3)$$

Consequently, in the present embodiment, the capacity of the RAM 27 to be incorporated in the ESP controller 22 was set to several K bits. And two points were considered; namely, the number of read times per second that does not hamper data display, and a time information thinning-out degree that does not make data display disagreeable to the eye. Ultimately, 20 write times per second and 10 read times per second were derived.

$$20 \text{ times (write)}/150 \text{ (subcode frames)} = 10 \text{ times (read)}/75 \text{ (subcode frames)} \quad (4)$$

Consequently, the capacity of the incorporated RAM 27 can be restricted to about 13% (4 Kbits) of the total. In this case, however, an error of a maximum of about 130 ms per second is inevitably involved due to the time information thinning out.

Thus, linking PCM data with its time information by making the upper address of the external DRAM 23 common with the address of the incorporated RAM 27 allows the microcomputer 20 to correct the subcode Q in time axis by means of two operations: (1) sending the time information of the PCM data being read from the disc 1 to the ESP controller 22 and (2) reading the time information from the ESP controller 22. Conventionally, the microcomputer 20 performs the time information conversion while monitoring the storage capacity of the DRAM 23 for displaying resultant data, thereby increasing the load of the microcomputer 20.

Figure 13:
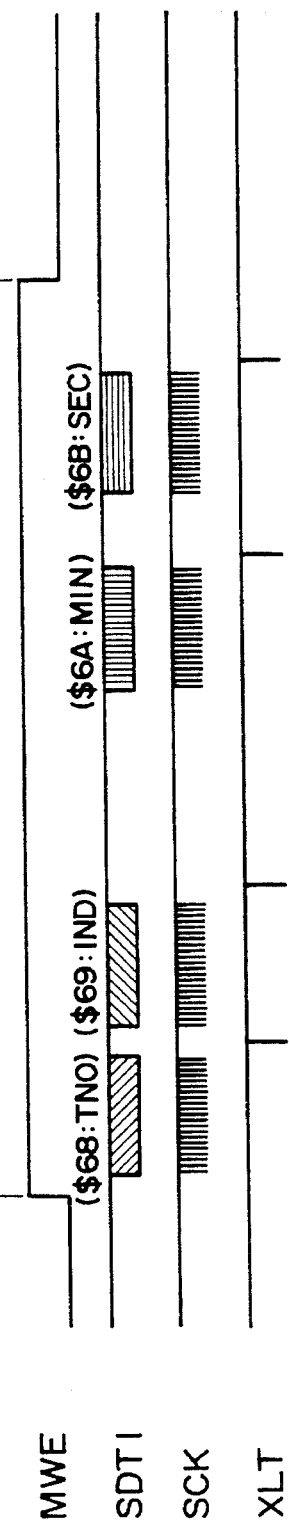
FIG. 13 is a timing chart describing a state in which a subcode Q is written.
Figure 14:
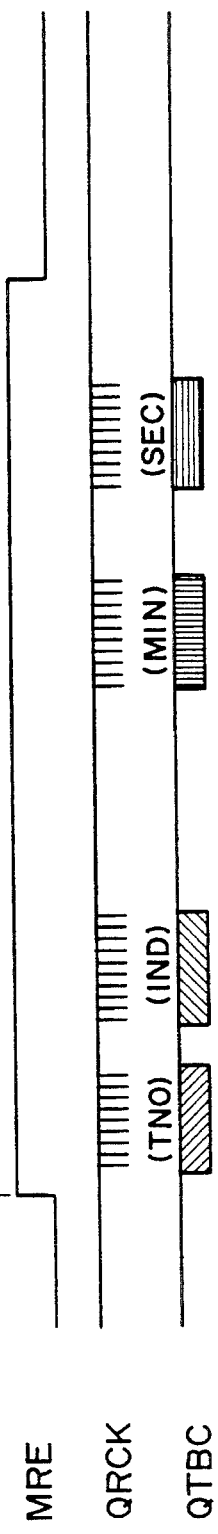
FIG. 14 is a timing chart describing a state in which the subcode Q is read.

In the ESP controller 22, the writing of the subcode Q to the incorporated RAM is performed while a write enable signal MWE is HIGH (13.3 ms/2) as shown in FIG. 13. In this case, the one-byte data TNO, IND, MIN, and SEC are put on serial I/F data, clock, and latch to be written in four time intervals with the least significant bit (LSB) first. On the other hand, the reading of the subcode Q from the RAM 27 is performed while the read enable signal MRE is HIGH (13.3 ms/2) as shown in FIG. 14. In this case, a LOW level pulse is sent 32 times as a read clock QRCK to read the TNO, IND, MIN, and SEC from a subcode Q output terminal QTBC with the LSB first.

In the above-mentioned embodiment, the present invention as applied to a CD player has been described. It will be apparent to those skilled in the art that the present invention is not restricted to the CD layer; instead, the present invention is applicable to other type of disc players for reproducing an MD or a CD-ROM disc as well.

As mentioned above and according to the invention, an amount of jitter contained in a write clock synchronized with a reproduction clock as opposed to a read clock synchronized with a fixed clock is detected, the detected jitter amount is added to or subtracted from a count output obtained by counting the write clock for 98 frames and an offset for the predetermined number of frames is given to an addition/subtraction result to generate a subcode synchronizing signal completely synchronized with the read clock, based on which subcode synchronizing signal, reproduction data is written to a large-capacity memory. This constitution implements data establishment on a time axis and sound linking on a time axis, so that, if the reproduction data at a sound linking point is processed with previous-value hold or interpolation, the sound linking can be performed without error and, in software having successive fixed patterns, correct sound linking is assured.

According to the invention, a reproduction subcode synchronizing signal read from a disc is compared with a count output of a write clock and, only when a match is found by a predetermined number of times successively, a generated subcode synchronized signal is made valid. This constitution eliminates a false reproduction subcode synchronizing signal caused by a scratch or the like on the disc and determines a true reproduction subcode synchronizing signal, thereby enabling to generate the subcode synchronizing signal without being affected by the scratch or the like on the disc.

According to the invention, time information of reproduction data to be written to a large-capacity memory is stored in a memory for storing the time information. In this constitution, the stored time information makes it unnecessary to a time converting operation while monitoring the storage capacity of the large-capacity memory, thereby mitigating the load of microcomputer software and displaying the time information real-time.

According to the invention, the time information is stored in the memory for storing the time information in a thinned-out manner to restrict a capacity of this memory a minimum, thereby providing the time information of reproduction data at a relatively low cost.

According to the invention, a subcode synchronizing signal synchronized with a read clock is generated. Therefore, if no sound overleap has occurred, the generated subcode synchronizing signal is used to establish reproduction data to be stored in the large-scale memory, thereby permitting data establishment by time axis. Further, according to the invention, if a sound overleap has occurred, writing of the reproduction data to the large-capacity memory is started on the basis of the generated subcode synchronizing signal, thereby implementing sound linking on time axis. Consequently, even if the reproduction data at a sound linking point is processed with a previous-value hold or interpolation, the sound linking can be performed without involving an error and, in software having fixed patterns successively, sounds can be linked correctly.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A disc player which writes reproduction data from a disc to a large-capacity memory and reads said reproduction data from said large-capacity memory for output, comprising:

means for producing a first clock signal having a fixed frequency;

means for obtaining a second clock signal synchronized with the frequency at which said reproduction data is read from said disc;

jitter detecting means for detecting an amount of jitter associated with said second clock signal with respect to said first clock signal;

counting means for counting said second clock signal for 98 frames;

adding and subtracting means for adding and subtracting said amount of jitter to and from a count output provided by said counting means; and offset means for providing an offset for a predetermined number of frames to an output of said adding and subtracting means, said offset means providing an output which determines the rate at which said reproduction data is written to said large-capacity memory.

2. A disc player as defined in claim 1, further comprising:

match detecting means for detecting a match occurring successively over a predetermined number of times between a reproduction subcode synchronizing signal obtained from said reproduction data and said count output of said counting means; and output determination means for validating the output of said offset means only when said match detecting means detects said match.

3. A reproduction data processing method for a disc player which writes reproduction data from a disc to a large-capacity memory and reads said reproduction data from said large-capacity memory for output, comprising the steps of:

generating a subcode synchronizing signal synchronized with a clock having a fixed frequency;

obtaining a reproduction subcode synchronizing signal from said reproduction data;

reading time information of a subcode contained in said reproduction data, said reading being performed in synchronization with said subcode synchronizing signal;

detecting a sound overleap by comparing said time information and a finally established address of said large-capacity memory; and if no sound overleap has been detected, establishing reproduction data to be stored in said large-capacity memory based on said subcode synchronizing signal.

4. A reproduction data processing method as defined in claim 3, further comprising the steps of:

accessing said finally established address upon detection of a sound overleap;

comparing said finally established address with said time information of said subcode read in synchronization with said subcode synchronizing signal; and if a match is found between said time information of said subcode and said finally established address, starting to write said reproduction data to said large-capacity memory based on said subcode synchronizing signal.

5. A compact disc player comprising:

an eight-to-fourteen modulation demodulating means for demodulating a radio frequency signal coming from an optical pick-up device;

first storage means for storing a signal coming from said eight-to-fourteen modulation demodulating means;

error correcting means for correcting an error of said signal stored in said first storage means and outputting the corrected signal to said first storage means;

deinterleaving means for deinterleaving said signal coming from said first storage means;

spindle servo signal processing means for controlling a spindle-drive motor in accordance with a signal coming from said deinterleaving means;

subcode signal processing means for capturing the signal coming from said eight-to-fourteen modulation demodulating means to output a subcode signal;

a microcomputer for checking said subcode signal coming from said subcode signal processing means for signal drop; and an electric shock-proof controller for capturing the signal coming from said deinterleaving means to detect for signal drop, said electric shockproof controller being connected to second storage means and said microcomputer.

6. A compact disc player as defined in claim 5, wherein said subcode signal processing means comprising:

means for producing a first clock signal having a fixed frequency;

means for obtaining a second clock signal synchronized with the frequency at which said reproduction data is read from said disc;

jitter detecting means for detecting an amount of jitter contained in said second clock signal with respect to said first clock signal;

counting means for counting said second clock signal for 98 frames;

adding and subtracting means for adding and subtracting said amount of jitter to and from a count output provided by said counting means; and offset means for providing an offset for a predetermined number of frames to an output of said adding and subtracting means, said offset means providing an output which determines the rate at which said reproduction data is written to said large-capacity memory.

7. A compact disc player as defined in claim 6, further comprising:

match detecting means for detecting a match occurring successively over a predetermined number of times between a reproduction subcode synchronizing signal obtained from said reproduction data and said count output of said counting means; and output determination means for validating said output of said offset means only when said match detecting means detects said match.

8. A compact disc player as defined in claim 6, further comprising:

a memory for storing time information of a subcode contained in said reproduction data.

* * * * *